Sept. 30, 1958 R. NEBOLSINE ET AL 2,854,146
APPARATUS FOR REMOVING SLUDGE FROM CLARIFIERS AND THICKENERS
Filed Jan. 14, 1955 3 Sheets-Sheet 1

INVENTORS.
Ross Nebolsine and
BY Angus D. Henderson
H. Lee Helms
attorney

United States Patent Office 2,854,146
Patented Sept. 30, 1958

2,854,146

APPARATUS FOR REMOVING SLUDGE FROM CLARIFIERS AND THICKENERS

Ross Nebolsine, New York, and Angus D. Henderson, Bayside, N. Y., assignors to Hydrotechnic Corporation, New York, N. Y., a corporation of New York Application January 14, 1955, Serial No. 481,734

2 Claims. (Cl. 210—525)

The present invention relates to the controlled separation of solids from liquids carrying said solids, and particularly to a method and apparatus for removing heavy particles or sludge from clarifiers and thickeners. "Clarification" is a term more frequently applied to the removal of solids from a liquid, where clarification of the liquid is the main objective, whereas "thickening" is a term applied where the main objective is to recover the solid content for commercial use. The present invention is applicable to both objects.

The invention is particularly adapted for commercial recovery of fine metal ore particles, and what is known as flue dust from gas washers connected with blast furnaces treating iron ore, although the method and apparatus is applicable to other materials desired to be removed from liquids, either for commercial recovery thereof, or for transforming the liquid portion into sufficiently pure state to be used for recirculation in a plant, or in the case of water per se to be discharged into a stream.

A characteristic of our method is to continuously flow the solids-containing liquid into the upper area of a bath of the liquid maintained at a suitable level, and in such manner that the solids-containing liquid is spread out away from the immediate area of its entry below the liquid level, providing a condition under which the solids descend gravitationally, and constantly and mechanically moving the solids inwardly towards the low center of the bath, and withdrawing them upwardly out of the area of deposit, through the bath and to a point of discharge, whereas the liquid freed of solids, or in the course of being stripped from the solids by gravitation of the latter, rises to the top area of the bath and to collection media by which the clarified liquid is discharged.

The invention and the apparatus embodiments will be described with reference to the accompanying drawings in which.

Figure 2:
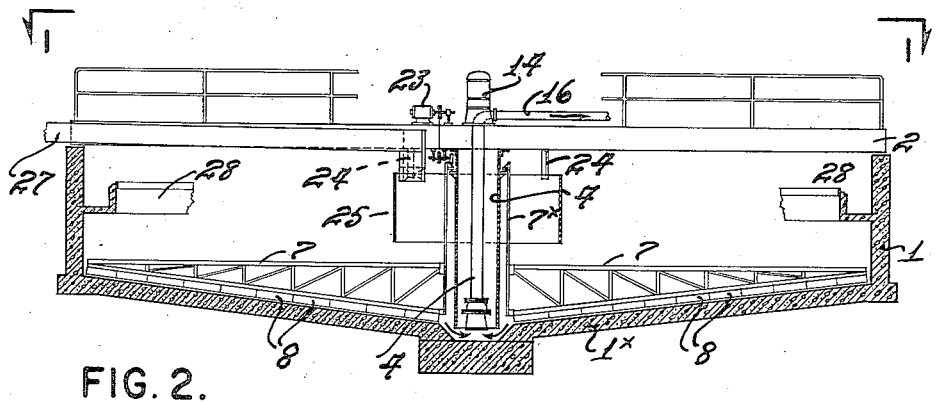
Fig. 2 is a vertical section on the line 2—2, Fig. 1.

Referring to the drawings, we have shown at 1 a tank, preferably concrete, and having an inwardly tapered bottom wall 1x. Supported by the sides of the tank, or in any other suitable manner, is a bridge 2 which is preferably made of spaced beams which may be tied together by cross struts, as for example those shown at 3 in Fig. 1.

Figure 1:
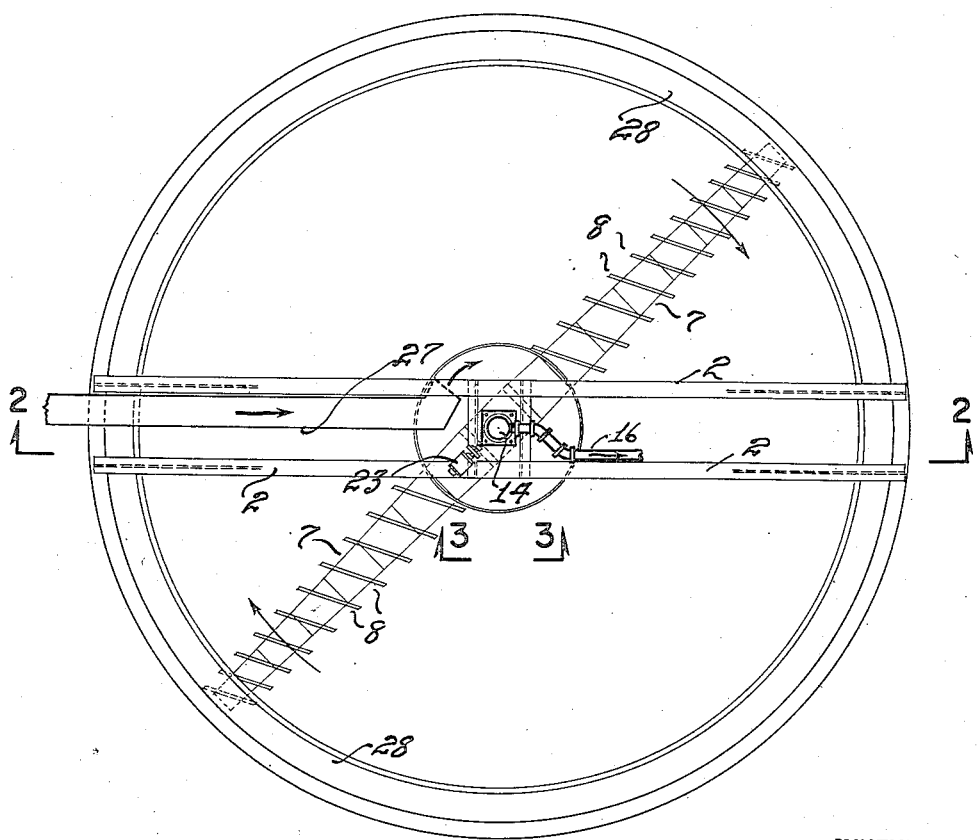
Fig. 1 is a top plan view, partly broken away, illustrating an embodiment of the apparatus, and looking downward in the direction of the arrows 1—1, Fig. 2.
Figure 3:
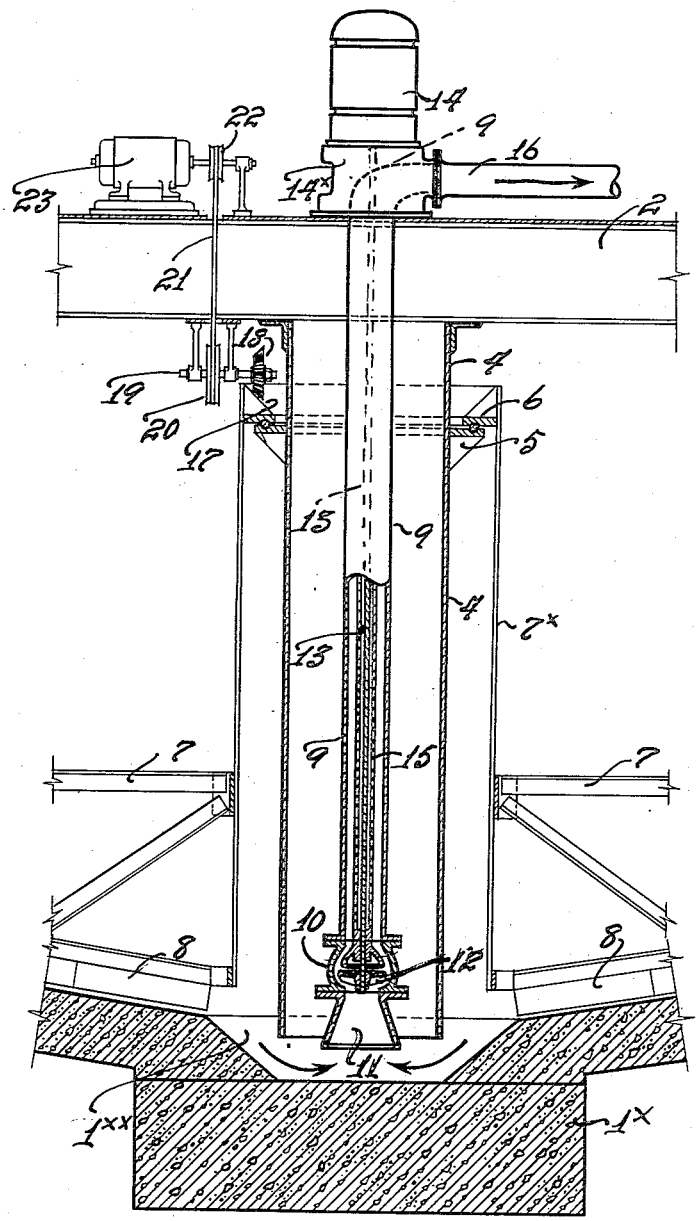
Fig. 3 is an enlarged view in elevation, partly broken away, showing the elements at the center area of the assembly.

Suspended from the bridge in the structure of Figs. 1 to 3 inclusive is a supporting hollow member 4 which carries a bearing ring 5, upon which rests or rotates the bearing ring 6 carried by rotating rake cage 7. The rake cage carries opposed rake trusses 7, to which are attached rakes 8. These rakes lie at an angle and when they are moved in the direction of the arrows, Fig. 1, their action is to move the solids progressively toward a sump 1xx at the center of the shaped concrete base of the tank.

Extending vertically through the hollow member 4, and into sump 1xx, is a pump assembly consisting of a pump discharge casing 9, pump housing 10, and intake nozzle 11. The pump may be of any suitable design and may be located on top of the bridge with its suction extending downward into sump 1xx.

In the present embodiment, the pump embodies an impeller 12, carried by shaft 13 extending to a motor 14, the latter being supported by the bridge 2. Shaft 13 is within a lubricator tube 15. The pump discharge casing 9 is formed within pump base 14x with an elbow discharge end communicating with an outlet pipe 16.

Carried by bearing ring 6 is a gear 17 to mesh with the gear wheel 18 on the shaft 19 hung by bracket arms from the bridge 2. On shaft 19 is a pulley 20 driven by belt 21 on a drive pulley 22 driven by motor 23.

As shown in Figs. 1 and 2, the bridge supports as by hangers 24, Fig. 2, a down draft annular member 25, the lower end of which extends within the bath or body of liquid within tank 1 and the mixture of liquid and solids to be treated is led into the down draft member by means of a conduit 27. The rising and solid strip liquid flows upwardly over the annular edge of an overflow weir 28, from which weir the clarified liquid may be discharged by gravity or a pump or pumps or in any other suitable manner.

In the operation of the structure shown in Figs. 1 to 3 inclusive, the mixture of fluid and solid flows into the down draft member 25 and into the fluid body supported by the tank, the mixture moving gradually outward. The clarified liquid is collected by overflow into the weir and into outlet means (not shown), most of the solid particles in the form of a sludge settle out and onto the bottom of the tank, meeting the rotating rakes by which the solids are raked toward the well or sump 1xx. At this point the sludge is picked up vertically and conveyed to outflow pipe 16, the operation being continuous. This is accomplished by making the central portion of the tank clear and available for installing one or a plurality of vertical pumps, acting through a hollow casing or column, and by means of a down draft surrounding the pump column for directing the fluid and solid mixture, together with employment of the elements as hereinbefore described. The high costs of providing pumps underneath the tank and the necessary chambers, access tunnels, power lines, ventilating ducts, drainage lines, controls, etc. necessary in the use and practice of withdrawing the sludge downwardly from the center of the tank, are avoided.

*Typical example*

As a typical example of the recovery of the fine iron ore or flue dust from gas washers connected with blast furnaces, an effluent generally containing from ¼ to 1% by weight of iron ore particles caught in the gas washers and washed down from there by water is treated. This effluent is conveyed to the center of the apparatus and enters the tank downward through draft tube 25. This mixture of water and dust moves gradually outward. The clarified liquid is collected by weir 28. Most of the solid particles, in the form of a sludge, settle to the bottom of the tank and are raked by the circularly moving rakes 8 toward the center of the settling tank. At this point instead of removing the sludge, or thickened liquid containing most of the solid particles, by a downward pipe or outlet connected to pumps located in a pump chamber underneath the center of the tank, or adjacent below it, such sludge is picked up vertically through the action of one or more vertical pumps located above the center of the tank. These pumps discharge said sludge through horizontal pipe or pipes 16 running radially out and over the top of the tank. From the edge of the tank this sludge can be conveyed to any desired point for further processing or utilization.

In order to achieve such a change in pocess, we have conceived the removal of the usual central support for the circular raking apparatus and substituting for said solid central support a hollow member or column which either is suspended from an extra strong bridge or truss spanning the entire tank, or supported by the bottom of the tank as a hollow column, but with provisions for admitting the sludge to the bottom of said hollow tube or column through vanes or openings in the bottom section of said supporting draft tube or column, as now to be described.

Figure 4:
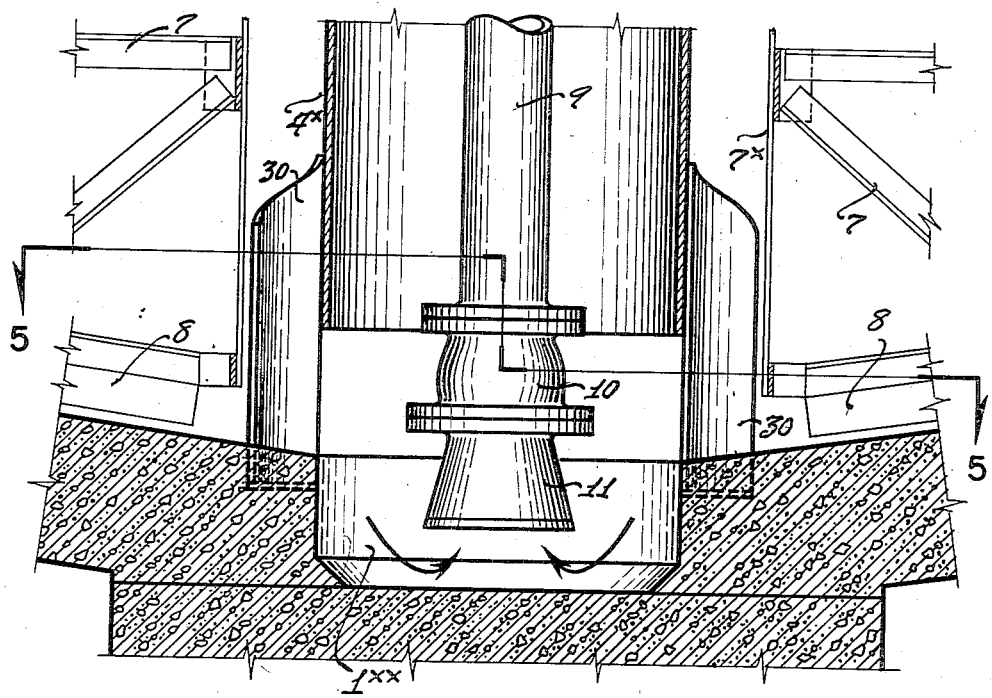
Fig. 4 is an enlarged vertical section of a modified form of the apparatus, in which the main supporting column is supported by the concrete base, showing the collecting vanes and their hollow column support, together with the pump and its discharge casing and a central portion of the concrete base, the rotating rakes being shown at their inner area.
Figure 5:
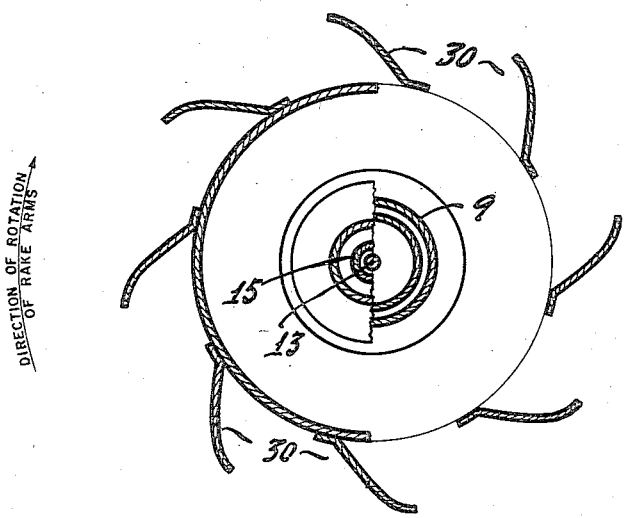
Fig. 5 is a view in transverse section, generally on the line 5—5, Fig. 4, showing the collecting vanes, their supporting hollow column, and certain elements of the pump discharge casing.

In the structure of Figs. 4 and 5, the column support $4x$ is directly supported by the concrete base of the tank and near its top it will provide a bearing similar to the bearing ring 5, Fig. 3, for the bearing and gear drive for the rotating rake cage $7x$, as in Fig. 3. The column $4x$ may rest directly upon the concrete, or may be held above the upper face of the tank bottom by means of vanes 30 as in Fig. 4. When the column support $4x$ extends downwardly to the tank bottom, it may be imbedded therein and suitably slotted to receive the sludge. In the embodiment shown in the drawing, the vanes 30 are sunk into the concrete so as to have both horizontal and lateral support thereby.

The vanes 30 are disposed at an angle, as shown in Fig. 5, that angle being directed toward the direction of rotation of the rake arms or blades so that the latter will progressively move the sludge into the well or sump $1xx$. It will be understood that the column support $4x$ may be sufficiently strong to provide adequate support for the bridge and the members carried thereby, as indicated in Fig. 3, thus reducing the length of span of the bridge.

It will be understood that any type of vertical pump or pumps, including air lift, can be used, and that various modifications may be made in the form and arrangement of the elements constituting the embodiment without departure from the spirit of the invention.

Having described our invention, what we claim and desire to secure by Letters Patent is as follows:

1. Apparatus for removing sludge from clarifiers and thickeners, comprising a tank adapted to hold a bath of solids-containing liquid, a central annular down-draft member for receiving such liquid into the tank, the tank having a hopper bottom tapered downwardly toward an axial sump, the sump being closed at its base, means for discharging from the tank clarified liquid at an upper area of a bath contained in the tank, rake means for progressively moving sludge along the bottom of the tank to said sump, a vertical, centrally positioned tubular member of comparatively large diameter passing through said bath, and a tubular casing passing upwardly through said tubular member and having an inlet in said sump, means for progressively exerting in said casing an upward propelling force to said sludge in the sump, and for removing said sludge through said casing and bath to a point above the same for collection, and in combination with angular extending vanes depending from said tubular member and anchored to the bottom wall of the tank, the vanes being adapted to divert the sludge into the sump and having passages between them leading to the sump.

2. Apparatus for removing sludge from clarifiers and thickeners, comprising a tank adapted to hold a bath of solids-containing liquid, a central annular down-draft member for receiving such liquid into the tank, the tank having a hopper bottom tapered downwardly toward an axial sump, the sump being closed at its base, means for discharging from the tank clarified liquid at an upper area of a bath contained in the tank, rake means for progressively moving sludge along the bottom of the tank to said sump, a vertical, centrally positioned tubular member of comparatively large diameter passing through said bath, and a tubular casing passing upwardly through said tubular member and having an inlet in said sump, means for progressively exerting in said casing an upward propelling force to said sludge in the sump, and for removing said sludge through said casing and bath to a point above the same for collection, and in combination with angular extending vanes depending from said tubular member and anchored to the bottom wall of the tank, the vanes being adapted to divert the sludge into the sump and having passages between them leading to the sump, a bridge supported by the tubular member, said propelling means comprising pump actuating means for said sludge-removal tubular member and carried by the bridge, and said rake means comprising a rake cage rotationally supported by said tubular member and having a drive gear, and means carried by the bridge for operatively engaging said drive gear and for rotating said rake cage.

References Cited in the file of this patent

UNITED STATES PATENTS

| | | |
|---|---|---|
| 1,337,094 | Peck | Apr. 13, 1920 |
| 1,357,587 | Peck | Nov. 2, 1920 |
| 1,969,022 | Laughlin et al. | Aug. 7, 1934 |
| 2,062,988 | Callow | Dec. 1, 1936 |
| 2,087,725 | Scott | July 20, 1937 |
| 2,150,865 | Shafer et al. | Mar. 14, 1939 |
| 2,557,316 | Scott | June 19, 1951 |